United States Patent
Bai

(10) Patent No.: US 8,290,704 B2
(45) Date of Patent: Oct. 16, 2012

(54) SYSTEM AND METHOD FOR COLLECTING AND CONVEYING POINT OF INTEREST INFORMATION

(75) Inventor: Xue Bai, Novi, MI (US)

(73) Assignee: Honda Motor Co., Ltd., Tokyo (JP)

( * ) Notice: Subject to any disclaimer, the term of this patent is extended or adjusted under 35 U.S.C. 154(b) by 453 days.

(21) Appl. No.: 12/262,601

(22) Filed: Oct. 31, 2008

(65) Prior Publication Data

US 2010/0114478 A1    May 6, 2010

(51) Int. Cl.
*G01C 21/00* (2006.01)
*G08G 1/123* (2006.01)

(52) U.S. Cl. ........ 701/450; 701/408; 701/409; 701/426; 701/523; 701/540; 340/991; 340/995.14; 340/995.24

(58) Field of Classification Search .......... 701/200–226, 701/400, 408, 409, 426, 430, 438, 450, 461, 701/523, 540; 340/990, 991, 995.14, 995.18, 340/995.22, 995.24
See application file for complete search history.

(56) References Cited

U.S. PATENT DOCUMENTS

| | | | |
|---|---|---|---|
| 6,636,799 B2 | 10/2003 | Jambhekar et al. | |
| 6,720,920 B2 | 4/2004 | Breed et al. | |
| 6,980,907 B2 | 12/2005 | Umezu et al. | |
| 7,016,899 B1* | 3/2006 | Stern et al. | 1/1 |
| 7,065,525 B1* | 6/2006 | Sasaki et al. | 369/13.01 |
| 7,127,723 B2 | 10/2006 | Endo et al. | |
| 7,355,525 B2 | 4/2008 | Tengler et al. | |
| 7,363,117 B2 | 4/2008 | Tengler et al. | |
| 7,480,565 B2* | 1/2009 | Ikeuchi et al. | 701/208 |
| 2002/0143769 A1* | 10/2002 | Tecu et al. | 707/10 |
| 2003/0139179 A1* | 7/2003 | Fuchs et al. | 455/426 |
| 2004/0254690 A1 | 12/2004 | Hasewaga et al. | |
| 2005/0114018 A1 | 5/2005 | Umezu et al. | |
| 2005/0114019 A1 | 5/2005 | Umezu et al. | |
| 2005/0283699 A1* | 12/2005 | Nomura et al. | 714/746 |
| 2006/0004517 A1 | 1/2006 | Hasegawa et al. | |
| 2006/0080030 A1 | 4/2006 | Okude et al. | |
| 2006/0111851 A1* | 5/2006 | Potgieter et al. | 702/35 |
| 2006/0122742 A1 | 6/2006 | Hasewaga et al. | |

(Continued)

FOREIGN PATENT DOCUMENTS

JP    2008165652 A  *  7/2008

OTHER PUBLICATIONS

English Translation JP 2008-165652A.*

*Primary Examiner* — Hussein Elchanti
*Assistant Examiner* — Rami Khatib
(74) *Attorney, Agent, or Firm* — Plumsea Law Group, LLC; Mark E. Duell

(57) ABSTRACT

A system and method for collecting and conveying point of interest (POI) information is disclosed. The system detects when a vehicle is at a previously unknown POI, gathers information related to the new POI, and updates a central server with the new POI location information. In this context, a POI may be any type of location including roads, gas stations, strip malls, retail establishments, eating establishments, hospitals, police stations, etc. POI information may include a variety of data including new road locations, new entrances to roads, toll amounts, gas station names, gas prices, strip mall names, retail establishment names, eating establishment names, sales and specials, hospital names, emergency room entrance locations, police station entrances, etc.

23 Claims, 8 Drawing Sheets

U.S. PATENT DOCUMENTS

| | | |
|---|---|---|
| 2006/0125921 A1* | 6/2006 | Foote .......................... 348/159 |
| 2006/0161340 A1 | 7/2006 | Lee |
| 2007/0150169 A1 | 6/2007 | Tomita et al. |
| 2007/0203638 A1 | 8/2007 | Tooyama et al. |
| 2007/0242339 A1* | 10/2007 | Bradley ........................ 359/237 |
| 2008/0033639 A1 | 2/2008 | Nakamura et al. |
| 2008/0059057 A1 | 3/2008 | Tengler et al. |
| 2008/0077314 A1 | 3/2008 | Ishikawa |
| 2008/0080682 A1* | 4/2008 | Ogunwale et al. ......... 379/93.17 |
| 2008/0082261 A1 | 4/2008 | Tengler et al. |
| 2008/0091339 A1 | 4/2008 | Nagase et al. |
| 2008/0255754 A1* | 10/2008 | Pinto ............................ 701/119 |
| 2009/0063038 A1* | 3/2009 | Shrivathsan et al. ......... 701/207 |
| 2009/0326791 A1* | 12/2009 | Horvitz et al. ................ 701/119 |
| 2010/0016016 A1* | 1/2010 | Brundage et al. .......... 455/556.1 |
| 2010/0076976 A1* | 3/2010 | Sotirov et al. ................. 707/737 |
| 2010/0267379 A1* | 10/2010 | Stahlin et al. ................ 455/426.1 |
| 2011/0015856 A1* | 1/2011 | Arnold .......................... 701/201 |

* cited by examiner

SYSTEM AND METHOD FOR COLLECTING AND CONVEYING POINT OF INTEREST INFORMATION

BACKGROUND

The present invention relates generally to the field of navigation, and more specifically to a system and method for collecting and conveying point of interest information.

Vehicle systems have been developed to assist operators of motor vehicles with navigation information. Navigation information may include directions to a desired destination from a current location, specific road information, and data on area restaurants, shops, gas stations, hospitals, etc. These systems may employ roadside-based networks, satellites, or other communication technologies to provide information to the motor vehicle operator. The location information may be provided on-demand from a remote location or obtained from a periodically-updated vehicle data storage unit.

In more recent years, vehicle systems have been designed to capture navigation information. For example, U.S. Patent Application Number 2008/0091339 to Nagase et al. teaches a vehicle having a navigation system capable of collecting road congestion information. Road congestion information includes time, date, link information which refers to data related to a road or portion of a road, driving speed, windshield wiper status, outside and road-surface temperatures, and vehicle location. A vehicle CPU judges whether each piece of collected information is relevant for transmission as prescribed by an information center. The relevant information is transmitted to the information center, and used to update one or more center databases, including the center map information database.

Additionally, U.S. Pat. No. 6,720,920 to Breed et al. teaches a collision avoidance system that uses a road map database and a method for acquiring digital map data. Digital map data is acquired by placing local area differential GPS stations along a road to be mapped. Using vehicle mounted GPS receivers, a mapping vehicle obtains its location from GPS satellites and corrections from the local differential GPS stations to two centimeter accuracy. Cameras are mounted on the vehicle to collect information about the road including the location of road signs, the general environment of the road, and anomalies. The types of vehicle cameras may vary and include linear cameras, laser radar, and video cameras. The collected information forms a road map database.

The aforementioned technology lacks the ability to detect when a vehicle is utilizing a previously unknown point of interest location, gather information related to the new point of interest location, and update a central server with the new point of interest location information. Therefore, there is a need in the art for a system and method that addresses the shortcomings of the prior art discussed above.

SUMMARY

The present invention relates generally to the field of navigation, and more specifically to a system and method for collecting and conveying point of interest information.

In one aspect, a vehicle system for collecting point of interest data comprises a control unit comprising a processor, a communications antenna in communication with the control unit, a GPS antenna in communication with the control unit and configured to provide a vehicle location, a storage unit storing navigation data including point of interest data and in communication with the control unit, and a sensing system in communication with the control unit and configured to capture and analyze point of interest data. The control unit determines point of interest data incomplete for the vehicle location and activates the sensing system. Collected point of interest data is stored in the storage unit.

In another aspect, the communications antenna is a designated short range communications antenna.

In another aspect, the point of interest data comprises price data.

In another aspect, the sensing system comprises at least one camera.

In another aspect, the sensing system comprises a sensor that senses the pumping of gasoline.

In another aspect, the point of interest data is transmitted exterior to the vehicle by the communications antenna.

In another aspect, a method for collecting new point of interest data comprises the steps of tracking navigation information for a present location using a GPS antenna and stored navigation data; determining a new point of interest by comparing the GPS location with current navigational data including point of interest data to determine whether point of interest data is lacking; associating the location with the new point of interest; capturing initial point of interest data using a sensor system including at least one associated camera; extracting additional point of interest data from the captured initial point of interest data; and storing the new point of interest data and additional point of interest data in vehicle storage unit using the sensor system.

In another aspect, the step of capturing the new point of interest data using a sensor system and associated cameras comprises initiating the gasoline sensor.

In another aspect, the step of capturing the new point of interest data using a sensor system including at least one associated camera comprises locating objects associated with the point of interest using the at least one camera.

In another aspect, the step of capturing the point of interest data using a sensor system including at least one associated camera comprises capturing at least one image using the at least one camera.

In another aspect, the step of extracting additional point of interest data from the captured point of interest data comprises extracting text from the at least one image using optical character recognition software.

In another aspect, a method for collecting new point of interest data comprises the step of transmitting the new point of interest data and the additional point of interest data to the service provider via a communications link.

In another aspect, the step of transmitting the new point of interest data and the additional point of interest data to the service provider via a communications link utilizing a DSRC system.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
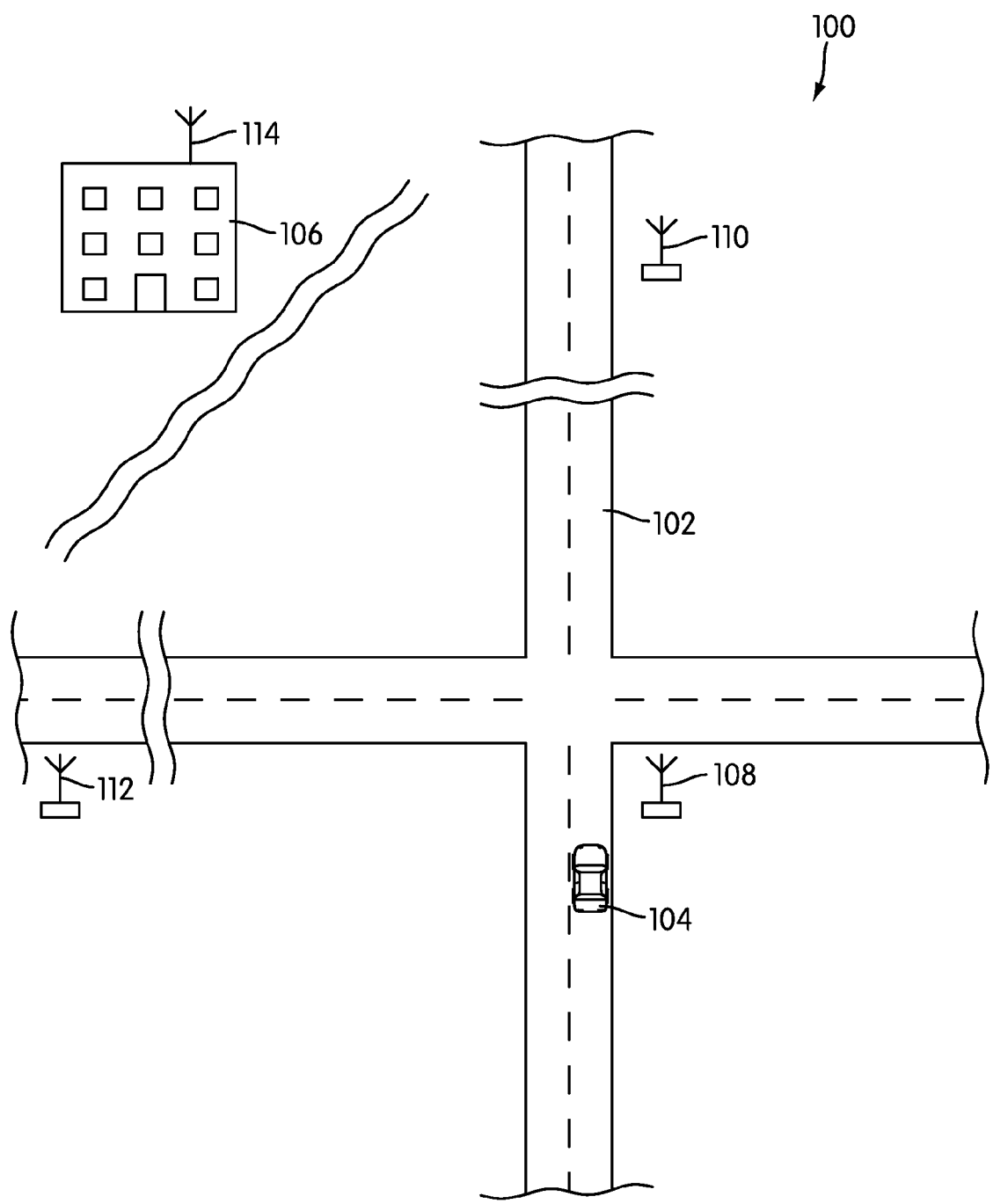
FIG. 1 is a schematic diagram of an embodiment of a DSRC system.

Embodiments of the present invention include a system and method for collecting and conveying point of interest (POI) information. The system detects when a vehicle is located or positioned at a previously unknown POI, gathers information related to the new POI, and updates a central server with the new POI location information. In this context, a POI may be any type of location including roads, gas stations, strip malls, retail establishments, eating establishments, hospitals, police stations, etc. POI information may include a variety of data including new road locations, new entrances to roads, toll amounts, gas station names, gas prices, strip mall names, retail establishment names, eating establishment names, sales and specials, hospital names, emergency room entrance locations, police station entrances, etc.

The system and method for collecting and conveying POI information may be provided with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

The POI collection and conveyance system may utilize a number of different technologies to collect and convey data. In general, the POI collection and conveyance system may utilize sensor technology on the vehicle and a telecommunications system to relay that information to another location. In some embodiments, the POI collection system may require some user input. In other embodiments, the POI collection system may be entirely automated. The POI conveyance system may utilize any telecommunications method known in the art, such as wireless or wireline systems. In a wireline system, for example, a user may connect the vehicle to a wireline system using one or more ports provided on the vehicle. The user could attach an on-board unit (OBU) to a modem, telephone, or other wireline telecommunications instrument, or directly to a wireline system if the OBU is provided with a modem. For example, the user may have such a wireline telecommunications instrument or connection to the wireline telecommunications system provided at or near where the user parks the vehicle. The OBU could then periodically or when "plugged in" transfer the collected information to a remote location for storage or redistribution to a fleet of vehicles.

In other embodiments, the POI conveyance system may utilize a wireless communications system. The wireless communications system may be any type of wireless communications system known in the art, for example, a cellular telephone network, satellite communications, or the like. Utilizing a wireless system allows a vehicle to transfer collected information periodically without the need for a physical connection to a wireline system. The vehicle could update the POI information to a remote location whenever the vehicle were in range of the wireless communications system. Using a wireless system could reduce the lag time between collecting new POI information and transferring that new POI information to a remote location for storage and/or redistribution to a fleet of vehicles.

In some embodiments, the POI system may utilize dedicated short range communications (DSRC). DSRC is a short to medium range communications service that provides communications links with high data transfer rates with minimal latency. Motor vehicles equipped with DSRC systems may communicate with each other or with road side equipment (RSE) configured to communicate with the motor vehicle DSRC systems as the motor vehicles pass within the range of the RSE. The range of DSRC is typically about 300 meters, with systems having a maximum range of about 1000 meters. DSRC in the U.S. operates in the 5.9 GHz range, from about 5.85 GHz to about 5.925 GHz. The typical latency for DSRC is about 50 ms.

Many motor vehicle systems already employ DSRC. For example, automatic toll collection uses DSRC technology. DSRC systems can typically communicate with vehicles operating at 100 miles per hour or less.

FIG. 1 is a schematic diagram of an embodiment of a DSRC system 100. A vehicle 104 may travel on a network of roads 102. The operator and/or passengers of vehicle 104 may desire to communicate with a remote location to transfer information. The information obtained may be used by systems in vehicle 104 or displayed on an audiovisual system for use by the occupant(s) of vehicle 104. In some embodiments, the information may include entertainment such as songs or videos, vehicle diagnostic information, and/or GPS information for use in a navigational system.

Vehicle 104 may obtain the information from a remote location having or connected to any type of information system at capable of transmitting and/or receiving information. In some embodiments, the information system may include one or more servers. In other embodiments, the information system may include the internet, other information networks, or any other type of information housing device or devices.

In some embodiments, the remote location may be building or an outdoor venue. More specifically, in some embodiments, the remote location may be a residence, business, or government entity. In an exemplary embodiment shown in FIGS. 1-3, the remote location may be a building housing a service provider 106 configured to communicate with one or more vehicles and one or more information sources. Service provider 106 may be linked to one or more servers containing stored information or other data.

In some embodiments, in order for vehicle 104 to communicate with service provider 106, an intermediate transceiver may be used. The intermediate transceiver or relay device may be any type of intermediate transceiver known in the art. The use of intermediate transceivers can increase the range of a telecommunications system. The use of an intermediate transceiver may also increase the robustness and/or capacity of the telecommunications system. For example, the intermediate transceivers may be linked to service provider 106 via a fast wireline connection with substantial throughput capabilities. This configuration allows several vehicles 104 to communicate a number of different requests to the intermediate transceiver which can then be transferred simultaneously to and from service provider 106 via the faster wireline connection. In some embodiments, vehicle 104 may initially communicate with a network of roadside equipment (RSE) 108, 110, 112. A network of RSEs may be positioned at intervals along a roads 102. The RSEs may then communicate with service provider 106. Similarly, when transmitting information to vehicle 104, service provider 106 may first communicate with the RSEs which then re-transmit the information to vehicle 104.

Figure 2:
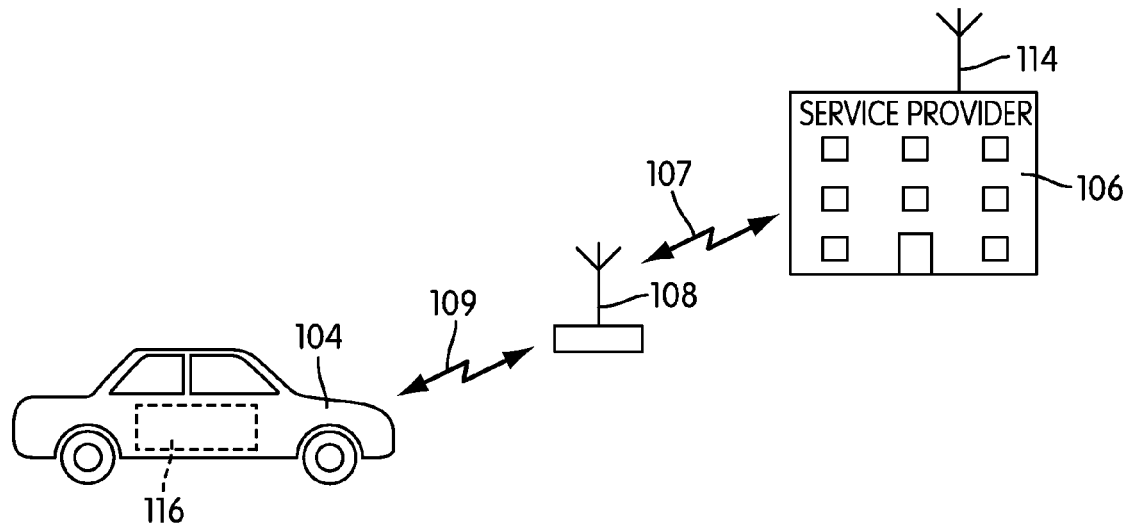
FIG. 2 is a schematic diagram of an embodiment of communication through a DSRC system between a vehicle, road side equipment, and a service provider.

FIG. 2 is a schematic diagram of an embodiment of the communication links through a DSRC system between vehicle 104, road side equipment 108, and service provider 106. Vehicle 104, via an on-board unit (OBU) 116, may wirelessly communicate through a first wireless communications link 109 with RSE 108. OBU 116 may be any type of OBU known in the art, such as a navigation system with an interactive display unit positioned in the cabin of vehicle 104, a computer integrated into the driving and other control systems of vehicle 104, or the like. RSE 108 may communicate with service provider 106 using any type of telecommunications link known in the art. For example, RSE 108 may wirelessly communicate through a second wireless communications link 107 with service provider antenna 114 associated with service provider 106.

RSE 108 may be any type of RSE known in the art, such as a transceiver positioned on a building, tower, billboard, road sign, or other roadside object. RSE 108 may be configured to communicate with any vehicle or remote location within the operating range of the communications system of RSE 108. First and second wireless communications links 107, 109 may have one or both of uplink and downlink capabilities. First and second wireless communications links 107, 109 may include security protocols, including encryption protocols.

Service provider 106 may provide POI data and other data stored in one or more servers to a number of subscribers or motor vehicle operators. For the purposes of this application "data" may include audio, visual, and/or any other type of information. The subscribers may receive periodic updates of POI data and other navigational data that may be incorporated into the navigational database on a vehicle.

Figure 3:
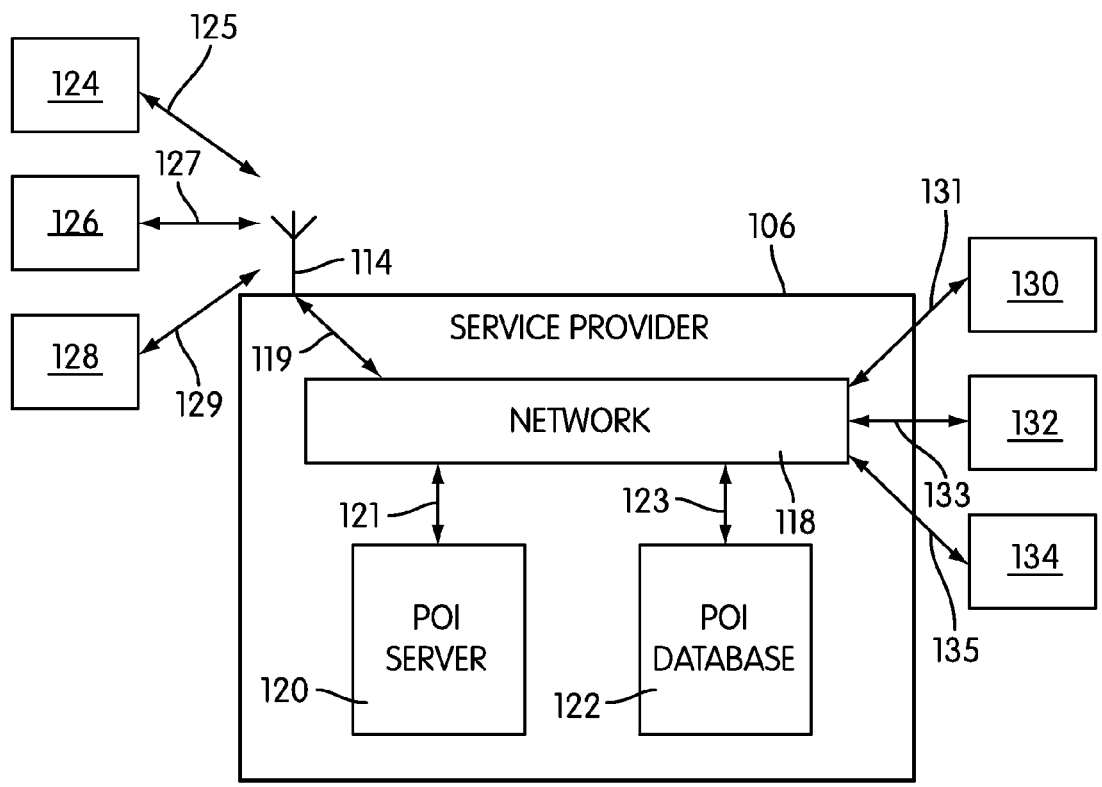
FIG. 3 is a schematic diagram of an embodiment of a service provider.

FIG. 3 is a schematic diagram of an embodiment of service provider 106. As shown in FIG. 3, service provider 106 may include a network 118 capable of communicating with one or more internal and external systems. In some embodiments, network 118 may include the Internet. In some embodiments, network 118 may communicate with POI server 120 through communications link 121 and with POI database 122 through communications link 123.

POI server 120 may be a server that interacts with POI data. However, in some embodiments, POI server 120 may also interact with other types of data. Therefore, POI server 120 may be used for POI data and other types of data. Similarly, POI database 122 may store POI data, but may also store other types of data. POI database 122 may be organized using any known data storage method and/or structure. In some embodiments, POI database 122 may be structured for quick retrieval of information. In other embodiments, POI database 122 may be structured for ease of data mining or updating. In some embodiments, the structure of database 122 may facilitate both quick retrieval and updating.

POI server 120 and POI database 122 may communicate with each other and other servers and databases (not shown) through network 118. In some embodiments, POI database 122 is stored on POI server 120. In other embodiments, POI database 122 may be stored remotely from and managed by POI server 120.

Service provider 106 may provide data to subscribers on a periodic basis or on demand. Service provider 106 may receive this data from multiple sources also on a periodic basis or on demand. First data provider 124, second data provider 126, third data provider 128, fourth data provider 130, fifth data provider 132, and sixth data provider 134 may all provide data to service provider 106 through communication links 125, 127, 129, 131, 133, and 135 respectively.

In some embodiments, data may be received wirelessly received at service provider 106 via service provider antenna 114, as illustrated in FIG. 3 for first, second, and third data providers 124, 126, 128. In some embodiments, service provider antenna 114 may be a DSRC antenna. In some embodiments, first, second, and third data providers 124, 126, and 128 may include vehicle 104 and/or other vehicles in the fleet. In these embodiments, vehicle 104 may be transmitting updated POI information to service provider 106, as is described in greater detail below.

In other embodiments, data may be provided via a local connection to network 118, as illustrated in FIG. 3 for data providers 130, 132, 134. In some embodiments, data fourth, fifth, and sixth data providers 130, 132, and 134 may include servers of businesses having franchises, such as gas stations or restaurant chains, or government agencies, such as a state or federal department of transportation. Fourth, fifth, and sixth data providers 130, 132, and 134 may provide updated POI information to service provider 106, such as when a new gas station or restaurant location opens, if a road is closed, a new toll booth is installed, or a new road is built.

In some embodiments, any data provider may provide updated road information to service provider 106 including newly constructed road information, information on retired roads, etc. This information may be utilized to provide the most updated routes to subscribers for navigational purposes. In other embodiments, other data providers may provide POI data, weather information, traffic information, or services information, such as the location and pricing of restaurants and gas stations.

Figure 4:
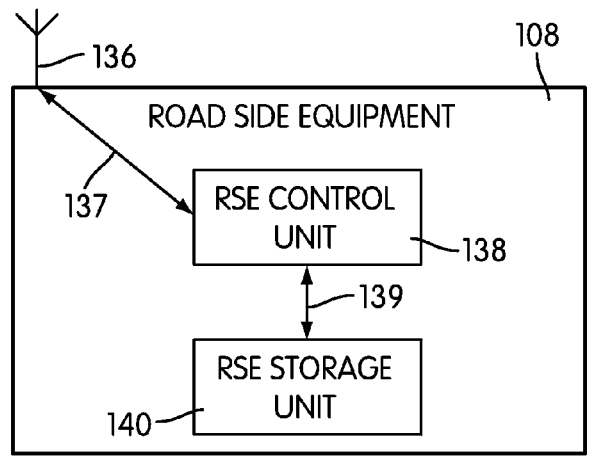
FIG. 4 is a schematic diagram of an embodiment of road side equipment.

FIG. 4 is a schematic diagram of an embodiment of RSE 108. RSE 108 may include an RSE control unit 138, an RSE storage unit 140, and an RSE antenna 136. RSE control unit 138 may communicate with RSE storage unit 140 via a communications link 139, which may be any type of communications link known in the art, such as a wire, a printed circuit board, or a wireless link. RSE control unit 138 may communicate with RSE antenna 136 via a communications link 137, which may be any type of communications link known in the art, such as a wire, a printed circuit board, a wireless link, or the like.

Generally, RSE control unit 138 may be any type of computer and/or processor known in the art that is capable of interpreting received telecommunications messages and interacting with other linked components. Generally, RSE storage unit 140 may be any type of electronic storage medium capable of short and/or long term storage of data. In some embodiments, RSE storage unit 140 includes both read and write capabilities. Examples of RSE storage unit 140 may include hard drives, flash drives, magnetic drives with removable storage media, such as disks or tape, or optical drives with removable storage media, such as discs, memory sticks, memory cards, or any other type of memory known in the art.

In some embodiments, the storage capacity of RSE storage unit 140 may be very high so that RSE storage unit may be purged of data at relatively long intervals, such as months or even years elapsing between purge cycles. In other embodiments, the storage capacity of RSE storage unit 140 may be relatively low so that RSE storage unit may purge data at relatively short intervals, such as minutes, hours, or days.

RSE antenna 136 may receive a wireless communication from a source, for example, vehicle 104. RSE control unit 138 may analyze the received communication including the identity of the source, store the received communication in RSE storage unit 140, identify the final destination for the information, and determine the path through the DSRC system for the information. The path may include one or more transfers through additional transceivers/relays.

In analyzing the received communication, RSE control unit 138 may determine if vehicle 104 is permitted to communicate with RSE 108, if a communications link can or should be established, and on what channel to transmit information. In effect, the RSE control unit 138 may authenticate the source and corresponding information. For example, vehicle 104 may be equipped with factory equipment that would permit vehicle 104 to communicate with service provider 106 if the owner/operator of vehicle 104 subscribed to a service. When vehicle 104 attempts to communicate with RSE 108, vehicle 104 may transmit a unique identifier, such as the vehicle identification number (VIN), password, or the like. A communications link between vehicle 104 and RSE 108 may only be established if RSE control unit 138, can verify that vehicle 104 is part of a subscribed network. This verification can be used to control uploading of information to RSE 108, downloading of information to RSE 108, or both. Different levels of access may be given to different vehicles based upon the status of the vehicle. For example, vehicle 104 may be configured to gather and transmit information without being a subscriber to the service, but may only receive updated information if a subscriber to the service. RSE control unit 138 may be able to determine and provide levels of access to RSE 108 and service provider 106.

The communications link between RSE 108 and vehicle 104 may be initiated by either RSE 108 or vehicle 104. In some embodiments, RSE 108 may continuously search for vehicles, such as by emitting a periodic signal that searches for a reply. If a vehicle replies, then a communications link may be established. In other embodiments, the vehicles may emit periodic signals searching for a reply from an in-range RSE. If an RSE replies, then a communications link may be established.

Figure 5:
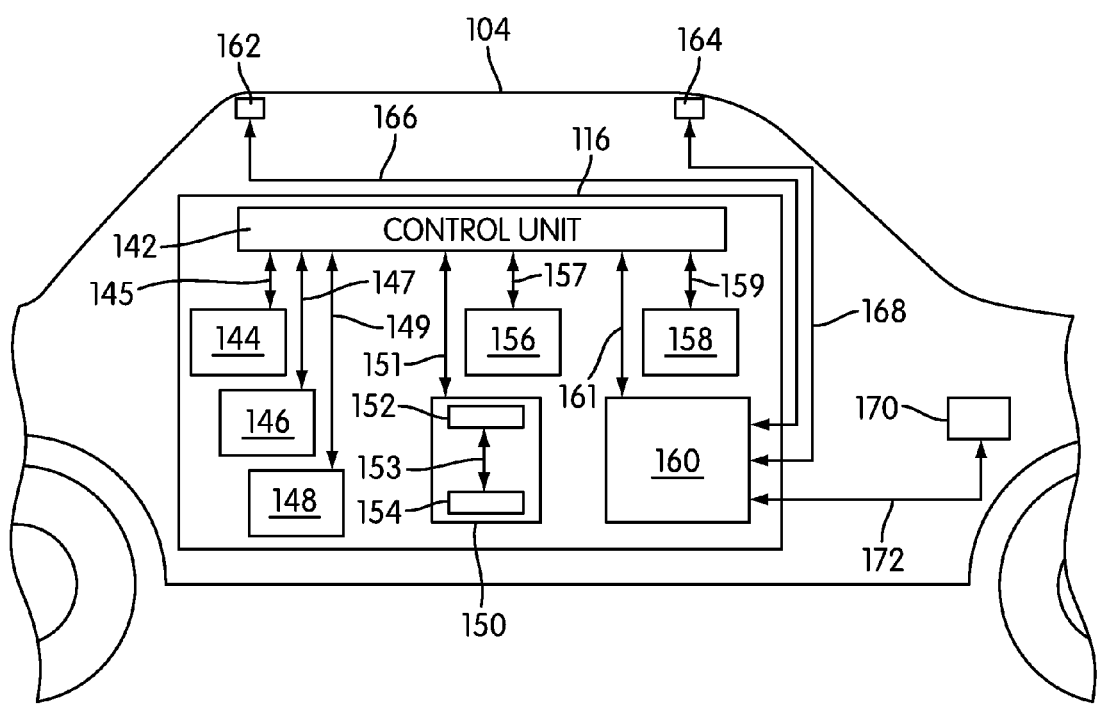
FIG. 5 is a schematic diagram of an embodiment of a vehicle.

FIG. 5 is a schematic diagram of an embodiment of a vehicle 104. Vehicle 104 may include OBU 116. OBU 116 includes the ability to control vehicle system communications. OBU 116 may include a vehicle control unit 142 including a processor, various vehicle subsystems 144, 146, 148, a navigation system 150, a vehicle storage unit 156, a DSRC antenna 158, and a vehicle sensor system 160. In some embodiments, components of OBU 116 may communicate with each other through vehicle control unit 142. In other embodiments, components of OBU 116 may communicate directly with each other.

Vehicle subsystems 144, 146, and 148 may include engine oil/coolant sensing systems, transmission oil sensing systems, brake sensing systems, fuel storage systems, fuel injection systems, or the like. Vehicle control unit 142 may communicate with vehicle subsystems 144, 146, and 148 through first vehicle communication link 145, second vehicle communications link 147, and third vehicle communications link 149, respectively. Communications links 145 147, and 149 may be any type of communications link known in the art.

Navigation system 150 may be any type of navigational system known in the art, for example the navigation system disclosed in U.S. Pat. No. 7,660,667 to Furukawa, issued Feb. 9, 2010, and entitled "System and Method for Off Route Processing," the entirety of which is incorporated herein by reference. The term "navigation information" refers to any information that can be used to assist in determining a location or providing directions to a location. Navigation information may include POI information or data. Examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite infrastructure (GNSS), including Global Positioning System or Satellite (GPS), Glonass (Russian) and/or Galileo (European). The term "GPS" is used to denote any global navigational satellite system. Navigation information can include one item of information, as well as a combination of several items of information.

Navigation system 150 may communicate with vehicle control unit 142 via a fourth vehicle communication link 151. Navigation system 150 may include a display 152 and a navigation database 154. Navigation display 152 and navigation database 154 may communicate with each other via a fifth vehicle communications link 153. Navigation display 152 may display navigational information to the operator of the vehicle using any type of display technology known in the art. GPS information may be provided to vehicle 104 from a remote location to determine the location of the vehicle.

Figure 6:
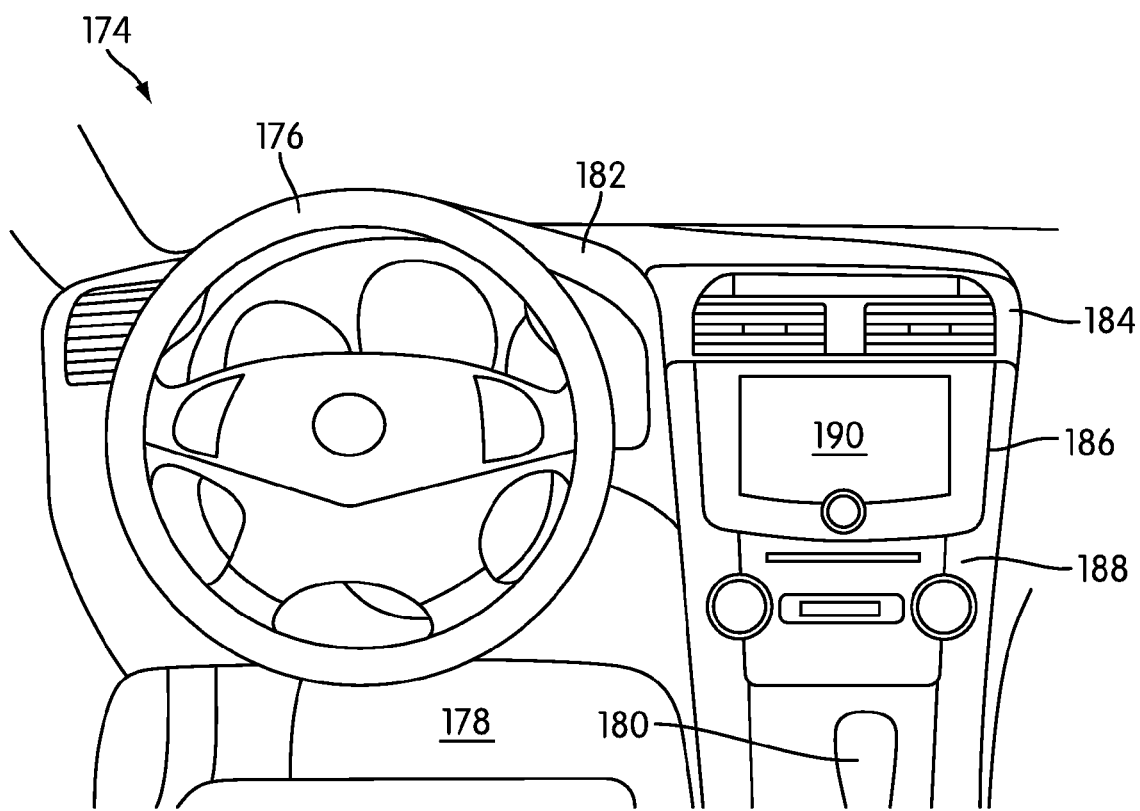
FIG. 6 is a schematic diagram of an embodiment of an interior of a vehicle.

The POI information may be used by the occupants of vehicle 104. FIG. 6 is a schematic diagram of an embodiment of an interior of a vehicle 174. Vehicle interior 174 may include a steering wheel 176, a driver's seat 178, a shifter or gear selector 180, a dashboard 182, and a center console 184. Center console 184 may include an upper portion 186 and a lower portion 188. In some embodiments, lower portion 188 includes radio and/or audio controls. Upper portion 186 may include a display 190. In some embodiments, upper portion 186 may includes a multi-function unit that can communicate or control an audio system, a climate control system, and/or navigation system 150.

In an exemplary embodiment, display 190 may be display device 152 shown schematically in FIG. 5. In some embodiments, display 190 can include a touch screen and buttons disposed next to display 190 to control the display so that a user may utilize display 190 as an interactive device for communicating with OBU 116.

OBU 116 may also include a vehicle storage unit 156 for storing vehicle data, navigation data including POI data, and other data. This data may be accessed by the different components of OBU 116. Vehicle storage unit 156 may communicate with vehicle control unit 142 via a sixth vehicle communications link 157.

OBU 116 may include a vehicle antenna 158 configured to communicate with vehicle control unit 142 and external entities. In other words, vehicle antenna 158 may receive transmissions from a remote locations and communicate the transmission to vehicle control unit 142. Similarly, vehicle control unit 142 may generate a message and transmit that message to a remote location through vehicle antenna 158. In the exemplary embodiment shown in FIG. 5, vehicle antenna 158 may be a DSRC antenna able to communicate with a local DSRC network. Vehicle antenna 158 may communicate with control unit 142 via a seventh vehicle communications link 159.

Finally, OBU 116 may include a sensing system 160 that receives and analyzes information for POI data collection. Sensing system 160 may communicate with control unit 142 via an eighth vehicle communications link 161. Sensing system 160 may include a number features that assist in image analysis including optical character recognition software.

Sensing system 160 may communicate with multiple devices that assist in collecting POI data. These devices may include a camera or a sensor. In an exemplary embodiment shown in FIG. 5, these devices may include first and second cameras 162, 164 and a gasoline sensor 170. First and second cameras 162 may communicate with sensing system 160 via ninth and tenth vehicle communications links 166, 168, respectively. Gasoline sensor 170 may communicate with sensing system 160 via an eleventh vehicle communications link 172.

Control unit 142 may signal sensing system 160 to initiate first camera 162 or second camera 164 based on one or more factors. In some embodiments, gasoline sensor 170 may detect that gas is currently being pumped into vehicle 104, which may initiate first and second cameras 162, 164.

In other embodiments, other triggers may initiate first and second cameras. For example, using the GPS antenna 154 and the navigation data in vehicle storage unit 156, OBU 116 may identify the vehicle location as being positioned at a POI that does not include complete POI data in any of the available databases. Sensing system 160 may then initiate first and second cameras 162, 164 in order to gather the missing POI data. In still other embodiments, the GPS location, incomplete POI data, and the speed of vehicle 104 may signal sensing system 160 to initiate one or more information gathering devices.

First and second cameras 162, 164 may be any type of camera known in the art. In some embodiments, first and second cameras 162 and 164 may be imagers capable of capturing an image in any or all of black and white, color, infrared, other spectra, two dimensions, or three dimensions. First and second cameras 162 and 164 may have any resolution known in the art, but in some embodiments first and second cameras 162 and 164 have a sufficiently high resolution to be able to capture wording on signs for later analysis, either by a technician or image recognition software. First and second cameras 162 and 164 may capture the images or data on any type of medium known in the art, including digital media, film, or the like. The captured images may then be transmitted, such as to sensing system 160, vehicle control unit 142, or to a remote location, for analysis.

Periodically, the data in vehicle storage unit 156 may be updated or new data may be downloaded due to a new subscription or new features to an old subscription. The download may be provided by service provider 106 or another service provider. In some embodiments, the download may occur upon the request of the operator of vehicle 104. In other embodiments, the download may occur upon request of the service provider. In still other embodiments, vehicle 104 may be programmed to request or service provider may be programmed to initiate a download periodically.

Figure 7:
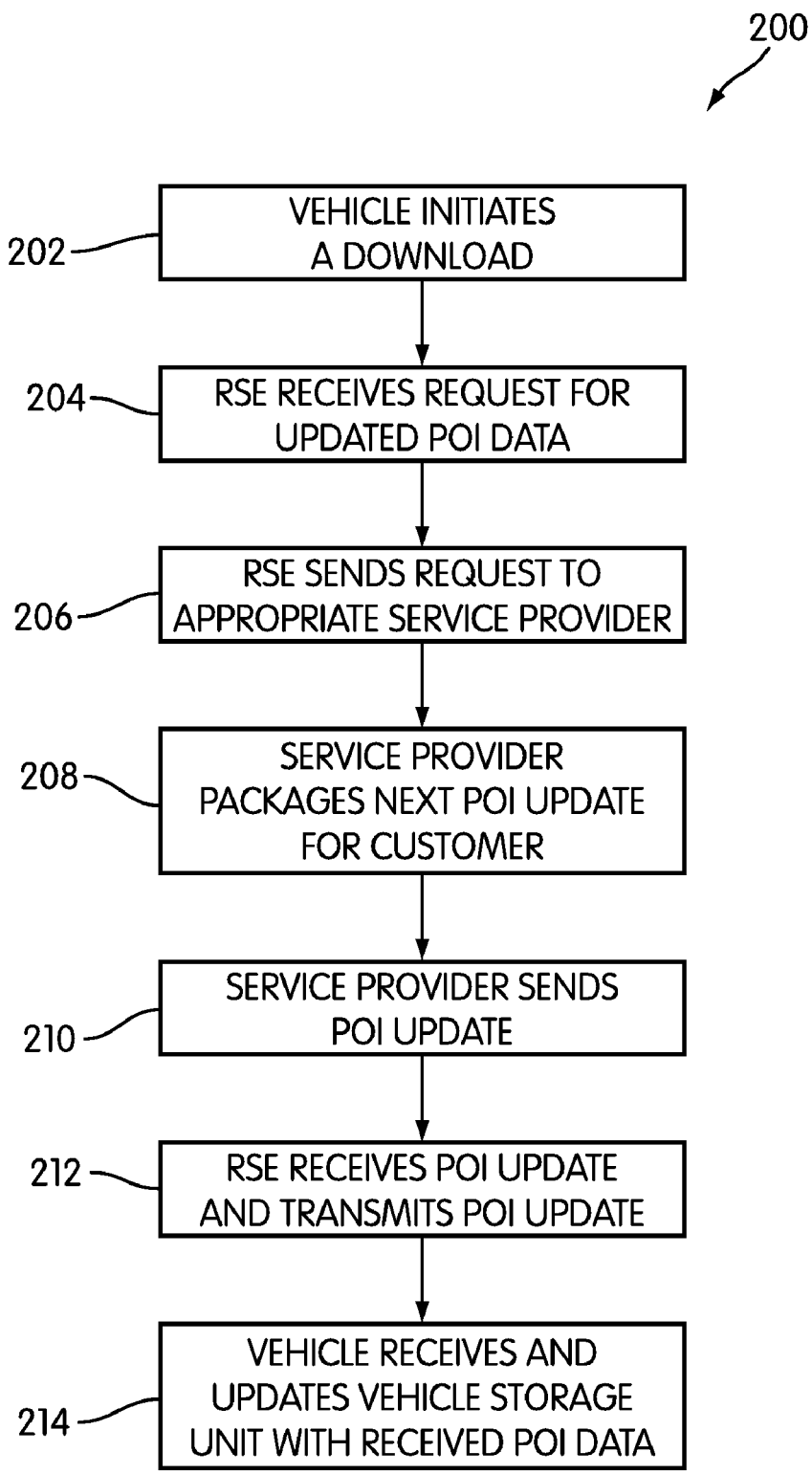
FIG. 7 is a schematic diagram of a method for updating POI data stored in a vehicle.

FIG. 7 is a schematic diagram of a typical method 200 for updating POI data stored in vehicle 104. Referring to FIG. 7, the method 200 for updating POI data may include a first step 202 of a vehicle, such as vehicle 104, initiating a download. Vehicle 104 may initiate the download by transmitting a request to an RSE such as RSE 108. A second step 204 in the method for updating POI data 200 may include an RSE receiving a request for updated POI data. As discussed above, the RSE may authenticate the request by determining if the requestor (the vehicle) is authorized to utilize the RSE and send and/or receive POI data.

A third step 206 of method 200 for updating POI information may include the RSE sending a request to the appropriate service provider, such as service provider 106. A fourth step 208 of method 200 may include the service provider packaging the next POI update for the requestor. A fifth step 210 of method 200 may include the service provider transmitting the POI update to the RSE. A sixth step of method 200 may include the RSE receiving the POI update and re-transmitting the POI update to the requestor (the vehicle). A seventh step 214 of method 200 may include the requestor receiving the POI data and updating the vehicle storage unit, such as vehicle storage unit 156, with the received POI data. Once updated, the POI data may be used by the occupants of the vehicle, such as with a navigation system like navigation system 150.

In method 200 of updating POI data assumes that the service provider has new POI data to transmit to the requestor. However, some of the information sources used by the service provider may not have the most up-to-date information, as the information sources may be static. For example, some of the information sources may include a department of transportation. The department of transportation may not update its own databases quickly enough to be able to show unexpected road closings due to accidents or forces of nature. Similarly, some of the information sources may include a major gas brand with franchise stations located around the country. The major gas brand may not know the precise pricing information at each franchise location on a daily or hourly basis. Also, the major gas brand may not wish to provide this information to the public due to business concerns. However, the fleet of subscriber vehicles such as vehicle 104 may wish to have this information. Due to this desire, vehicle 104 and other similar subscriber vehicles may collect and transmit POI data as new POIs or updated information regarding existing POIs are detected. The transmitted data may be incorporated into a POI database such as POI database 122 associated with service provider 106 as shown in FIG. 3. This POI information may then be transmitted to other subscribers in the fleet.

Figure 8:
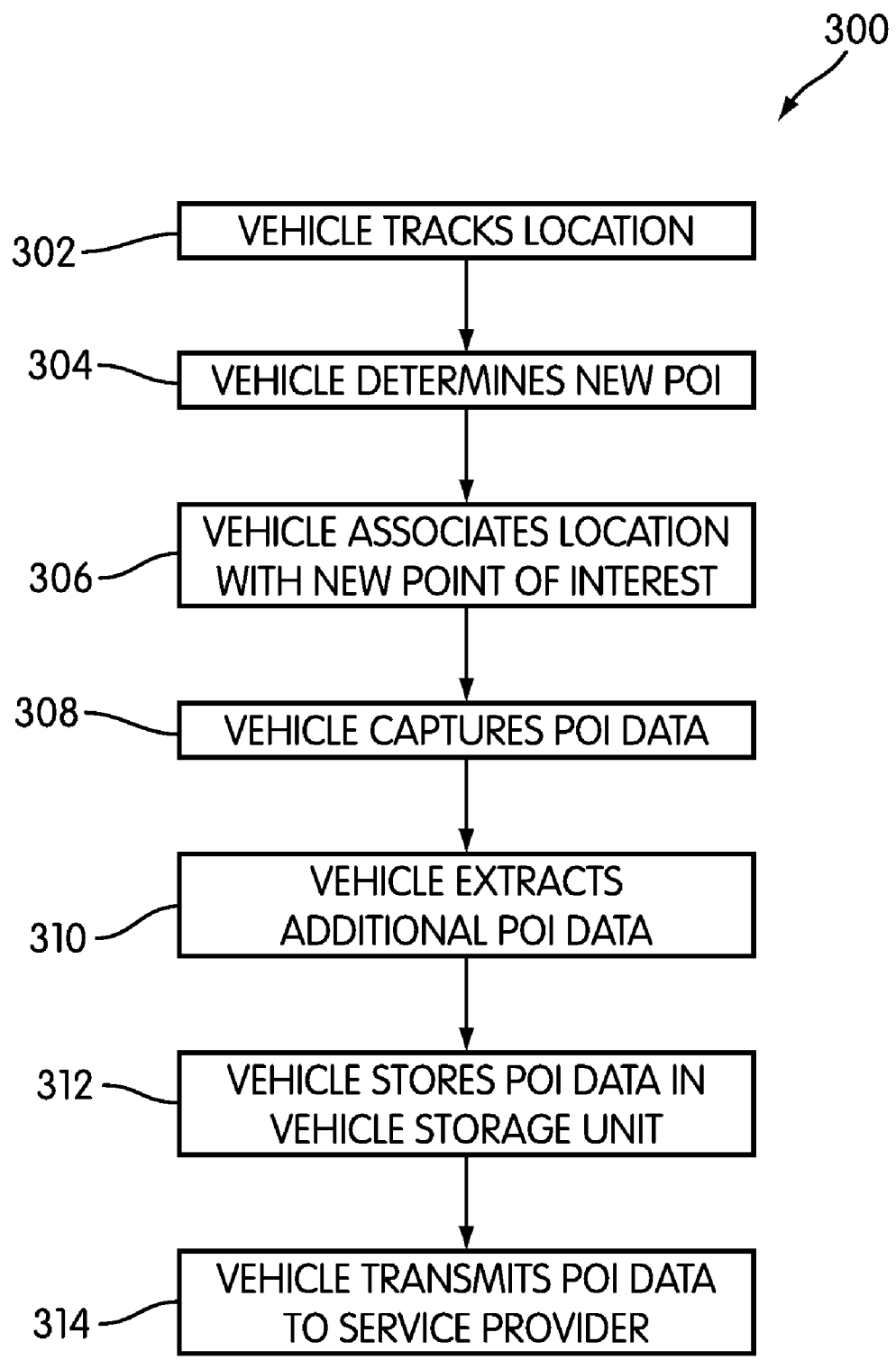
FIG. 8 is a schematic diagram of a method for collecting and conveying POI data by a vehicle.

FIG. 8 is a schematic diagram of a method 300 for collecting and conveying POI data by a vehicle. Referring to FIG. 8, method 300 for collecting and conveying POI data may include a first step 302 of a vehicle tracking its location. In an exemplary embodiment, vehicle 104 as described above may practice method 300 for collecting and conveying POI data. This step may be performed by utilizing the GPS aspect of the vehicle's navigation system, such as navigation system 150 discussed above. Vehicle 104, using vehicle control unit 142, may track navigation information continuously for a present location using GPS antenna 154 and the navigation information stored in vehicle storage unit 156 (see FIG. 5).

A second step 304 may include the vehicle determining a new POI. This step may include encountering a new road, toll booth, gas station, or restaurant not currently known to the vehicle. For example, vehicle 104 may determine its location is positioned near a POI but the vehicle's POI database does not include complete information on the POI or the POI itself is unrecognized, i.e., no information is available for the POI. Vehicle 104 may recognize the POI as a new POI because the navigation information, and more specifically the POI data, for the present location is incomplete.

Figure 9:
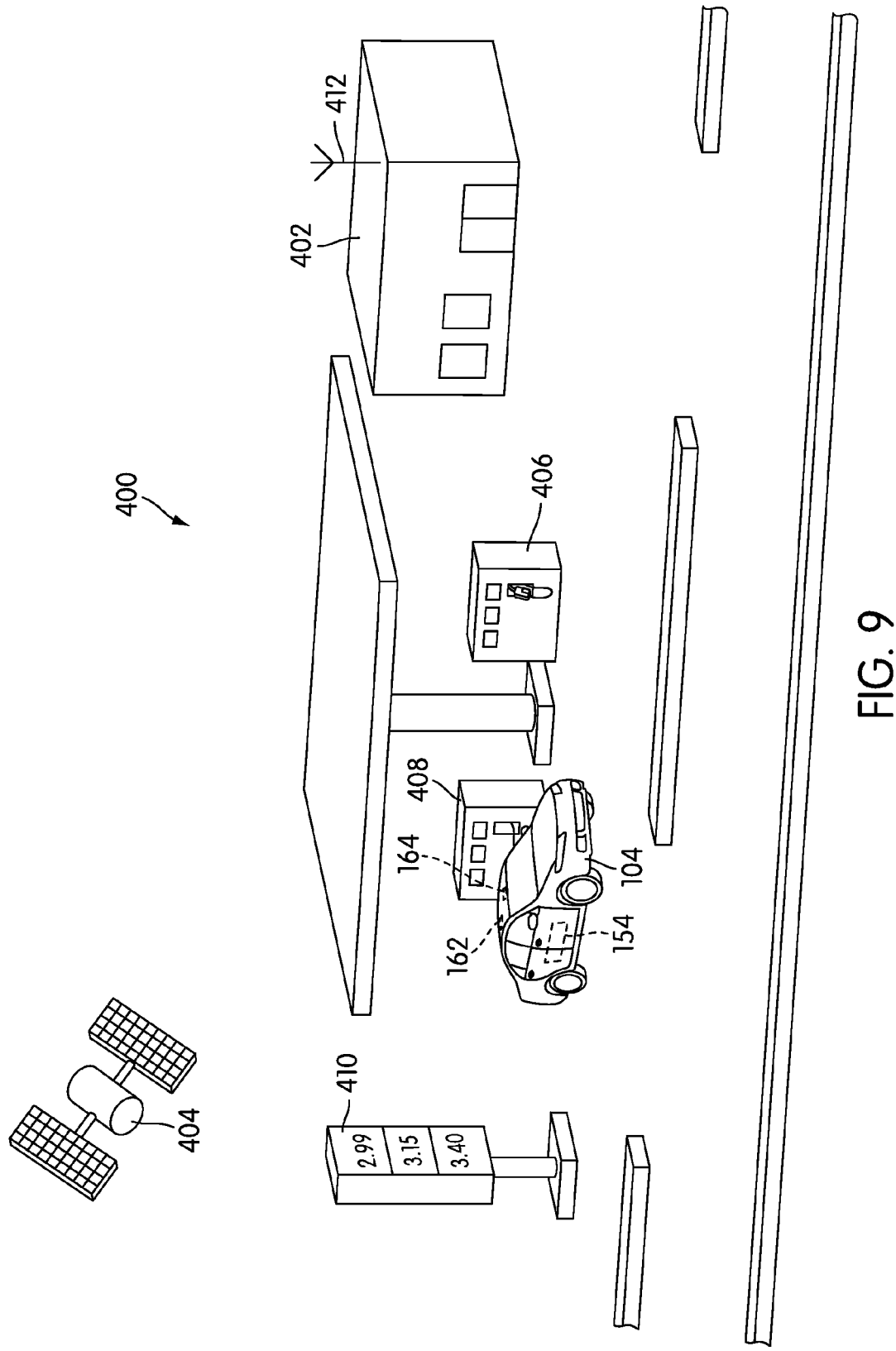
FIG. 9 is a schematic diagram of the step of the sensor system capturing POI data.

FIG. 9 is a schematic depiction of vehicle 104 at a POI. In an exemplary embodiment, the POI may be a gas station 400. Vehicle 104 may include GPS antenna 154 and first and second cameras 162, 164. GPS antenna may be in communication with GPS satellite 404 that provides the vehicle 104 with a location, such as GPS coordinates. Gas station 400 may include gas station office/store 402 having a station antenna 412, pumping stations 406, 408, and a gas station sign 410.

A third step 306 of method 300 may include the vehicle associating the vehicle's location with the POI. This step gives the POI a precise location for storage in the POI database. In the exemplary embodiment and with reference to FIG. 9, vehicle 104, using vehicle control unit 142, may associate the location or GPS coordinates with the new POI.

A fourth step 308 of method 300 may include a sensor system for capturing POI data. This step may include having one or more cameras on the vehicle capturing pricing information, hours of operation, or the like. In the case of an unrecognized or previously unknown POI, other identifying information related to the POI may also be obtained, such as a type of POI (gas station, toll booth, new road, etc.), name, brand, store number, or the like. In the exemplary embodiment and with reference to FIG. 9, sensor system 160 may capture POI data.

Figure 10:
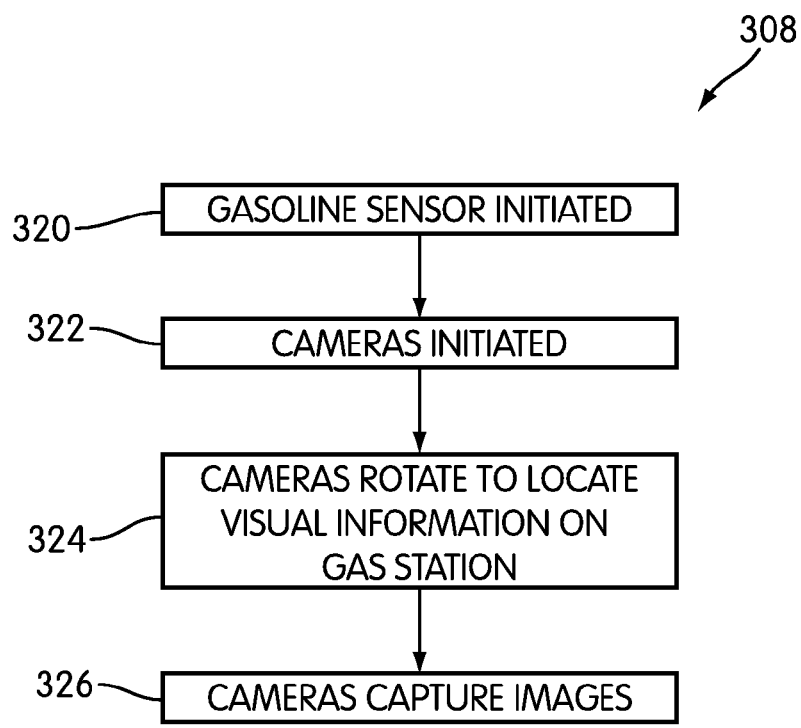
FIG. 10 is a schematic diagram of the step of the sensor system extracting additional POI data.

In some embodiments, fourth step 308 may include a series of more discrete steps. FIG. 10 is a schematic diagram of an embodiment of the series of discrete steps that may be performed by the sensor system capturing point of interest data at a gas station. Fourth step 308 may be expanded to include a first step 320 of the gasoline sensor being initiated by detecting the flow of gasoline into vehicle 104. The gasoline sensor then initiates the cameras in second step 322. A third step 324 may include the cameras locating visual information on the gas station. This step may include visual recognition software connected to or associated with the cameras that permit the cameras to determine automatically whether or not the desired image is in view of the cameras. In other embodiments, the occupants of the vehicle may be asked to verify that the image in view captures the desired information. For example, the image may be displayed in the vehicle and a question prompting the verification of the image may also be displayed. The occupants may then verify or reject the image using the input method associated with the display, such as voice recognition, a touch screen, or a keyboard. A fourth step 326 may include the cameras capturing the image for analysis and/or transmission.

In this embodiment and with reference to FIG. 9, the act of the motor vehicle driver pumping gas activates sensor system 160, which notifies vehicle control unit 142. Vehicle control unit 142 may then direct sensor system 160 to initiate first and second cameras 162, 164. First and second cameras 162, 164 may move to locate and identify nearby three-dimensional objects. For example, first camera 162 may identify gas station sign 410 as an object of interest and capture its image. First and second cameras 162, 164 may capture additional objects of interest including the gas station name and the entrance or entrances to the gas station from the road.

In other embodiments, the POI data may be captured differently. For example, gas station office/store 402 may include a gas station antenna 412. Gas station antenna 412 may transmit real time gas station point of interest data, including gas prices, gas station name, gas station location information, services, etc. In such embodiments, the gas station antenna 412 may be a DSRC antenna.

A fifth step 310 of method 300 may include the sensor system extracting additional POI data. As discussed above, the sensor system may be provided with image analysis software that may enable the OBU of the vehicle to determine the POI data from the captured images. For example, if the cameras capture an image of a gas station sign, the software may be able to determine the price of the gasoline as displayed on the sign. In some embodiments, the software may include optical character recognition that may be used to extract alphanumeric information from the captured image. This alphanumeric information may then be used as POI data. In some embodiments, once the POI data has been extracted from an image, the POI data may be displayed on a display in the vehicle's occupant compartment for verification. For example, the occupants of the vehicle may be asked to confirm that the extracted price of gasoline matches the displayed price of gasoline. Optionally, the image may be transmitted to a remote location for image analysis. The image analysis at either the vehicle or the remote location may include optical character recognition used to extract alphanumeric characters from the image. The alphanumeric characters may then be treated as POI data for inclusion in the POI database.

Figure 11:
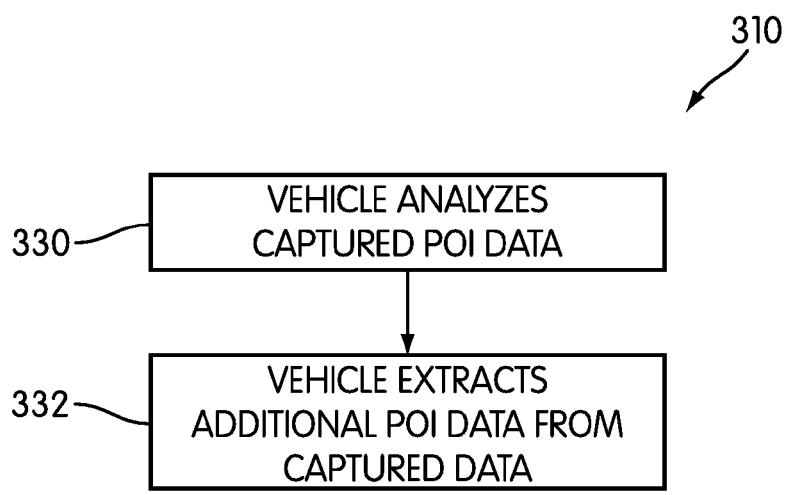
FIG. 11 is a schematic depiction of a vehicle at a POI.

FIG. 11 is a schematic diagram of step 310 of the sensor system extracting additional POI data. Referring to FIG. 11, a method for the sensor system to extract additional POI data 310 may include a first step 330 of sensor system 160 analyzing captured POI data, and a second step 332 of sensor system extracting additional POI data from captured data.

Sensor system 160 may scan the images and extract text using optical character recognition software to find gas station names, gasoline prices, etc. Sensor system 160 may also scan the images to identify other three-dimensional objects programmed into memory, including the number of entrances to the gas station and their general locations.

A sixth step 312 of method 300 may include the sensor system storing the extracted POI data in a vehicle storage unit. The vehicle may store this information for its own use at a later date.

In sixth step 312, sensor system 160 may store POI data in vehicle storage unit 156. Sensor system 160 may transmit the POI data to vehicle storage unit 156 via vehicle control unit 142. Either sensor system 160 or vehicle control unit 142 may be capable of arranging the data in the proper format for storage purposes.

Finally, a seventh step 314 of method 300 may include the vehicle transmitting the POI data to a remote location, such as the service provider. The service provider may then update its own POI databases and provide this up-to-date information to its fleet of subscribers on a periodic update or on demand update of POI data.

In the exemplary embodiment, vehicle 104 may convey or transmit the collected POI data to a service provider in seventh step 314. In conveying the POI data, vehicle 104 may use its DSRC antenna to contact the service provider via one or more RSEs. In some embodiments, the timing of the conveyance may be immediate. In other embodiments, the data may be conveyed nightly. However, in still other embodiments, longer or shorter periods of time may be utilized.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A method for updating a database including point of interest (POI) information comprising the steps of:

receiving information related to a position of a vehicle;
determining if the vehicle is located proximate a POI;
detecting a fuel level with a fuel sensor;
gathering new data related to the POI using a sensor system associated with the vehicle when the fuel sensor detects an input of fuel into the vehicle;
wherein the sensor system includes an imaging device and wherein the new data includes information extracted from an image captured by the imaging device; and
transmitting the new data to a central location using a dedicated short range communications (DSRC) system.

2. The method of claim 1, further including displaying the gathered new data in the occupant compartment of the vehicle for verification.

3. The method of claim 2, wherein the new data includes fuel price information, and wherein displaying the gathered new data includes requesting an occupant of the vehicle to confirm that the gathered fuel price information matches the price displayed at the POI.

4. The method of claim 1, wherein the POI comprises a gas station and the information related to the POI comprises fuel pricing.

5. The method of claim 1, wherein the new data is extracted from the image using image analysis software.

6. The method of claim 1, further including the steps of determining whether the POI is currently known by the POI database; and
storing the location of the POI in the POI database if the POI is not known by the POI database.

7. The method of claim 1, further comprising the step of orienting the imaging device prior to capturing the image.

8. The method of claim 1, wherein the new data is extracted from the image prior to transmitting the new data to the central location.

9. The method of claim 1, wherein optical character recognition is used to extract alphanumeric information from the image, and wherein the new data comprises the alphanumeric information.

10. The method of claim 1, wherein the DSRC system uses road side equipment configured to interact with both the central location and the vehicle.

11. The method of claim 1, further comprising the step of authenticating the vehicle to the DSRC system.

12. A method for updating a POI database stored on a vehicle and including point of interest (POI) information comprising the steps of:
receiving information related to a position of a vehicle;
determining if the vehicle is located proximate a POI;
gathering new information related to the POI using a sensor system associated with the vehicle;
determining whether the POI is currently known by the POI database;
obtaining other identifying information related to the POI if the POI is not currently known by the POI database;
updating the POI database with the new information and other identifying information related to the POI, to produce an updated POI database that includes the new information and the other identifying information; and
transmitting the new information and the other identifying information to a central location.

13. The method of claim 12, wherein transmitting the new information and the other identifying information to a central location is performed using a dedicated short range communications (DSRC) system.

14. The method of claim 12, further including a step of displaying the gathered new information in the occupant compartment of the vehicle for verification.

15. The method of claim 12, wherein the POI comprises a gas station and the information received from the first vehicle comprises fuel pricing information.

16. The method of claim 15, wherein the fuel pricing information is gathered by receiving an image of the fuel pricing as displayed at the gas station and analyzing the image to extract the fuel pricing information.

17. A system for updating a database comprising:
a system dedicated short range communications (DSRC) receiver configured to receive point of interest (POI) information from a vehicle DSRC transmitter associated with a vehicle communications system associated with a first vehicle;
a sensor system associated with the vehicle and configured to receive fuel level signals from a fuel sensor;
the sensor system being configured to gather POI information when the fuel sensor detects an input of fuel into the vehicle;
a transmitter configured to relay the POI information to a central system;
a receiver configured to receive database information from the central system, wherein the database information contains the POI information if the POI information is new POI information; and
a system DSRC transmitter configured to relay the database information to a vehicle DSRC receiver associated with a second vehicle.

18. The system of claim 17, wherein the POI information includes the location of a new POI.

19. The system of claim 18, wherein the system is configured to extract the POI information from the image using image analysis software.

20. The system of claim 17, wherein the POI information includes pricing information.

21. The system of claim 17, wherein the system DSRC transmitter and the system DSRC receiver are associated with road side equipment.

22. The system of claim 17, wherein the POI comprises a gas station and the POI information comprises fuel pricing.

23. The system of claim 17, wherein the sensor system includes an imaging device and wherein the POI information includes information extracted from an image captured by the imaging device.

* * * * *